May 17, 1960 J. A. PAGE 2,936,910

PORTABLE STORAGE PLANT

Filed Oct. 3, 1956 8 Sheets-Sheet 1

INVENTOR
JAMES A. PAGE

BY Diggins & LeBlanc

ATTORNEYS

May 17, 1960 J. A. PAGE 2,936,910

PORTABLE STORAGE PLANT

Filed Oct. 3, 1956 8 Sheets-Sheet 2

INVENTOR

JAMES A. PAGE

BY

Diggins & LeBlanc

ATTORNEYS

May 17, 1960 J. A. PAGE 2,936,910

PORTABLE STORAGE PLANT

Filed Oct. 3, 1956 8 Sheets-Sheet 3

INVENTOR

JAMES A. PAGE

BY Diggins & LeBlanc

ATTORNEYS

May 17, 1960 J. A. PAGE 2,936,910

PORTABLE STORAGE PLANT

Filed Oct. 3, 1956 8 Sheets-Sheet 4

INVENTOR
JAMES A. PAGE

BY Diggins & LeBlanc
ATTORNEYS

BY

INVENTOR
JAMES A. PAGE

Diggins & LeBlanc
ATTORNEYS

May 17, 1960 J. A. PAGE 2,936,910

PORTABLE STORAGE PLANT

Filed Oct. 3, 1956 8 Sheets-Sheet 6

INVENTOR
JAMES A. PAGE

BY Driggins & LeBlanc
ATTORNEYS

May 17, 1960 J. A. PAGE 2,936,910
PORTABLE STORAGE PLANT
Filed Oct. 3, 1956 8 Sheets-Sheet 7

JAMES A. PAGE
Diggins & LeBlanc

May 17, 1960 J. A. PAGE 2,936,910

PORTABLE STORAGE PLANT

Filed Oct. 3, 1956 8 Sheets-Sheet 8

INVENTOR
JAMES A. PAGE

BY Diggins & LeBlanc

ATTORNEYS

United States Patent Office 2,936,910
Patented May 17, 1960

2,936,910

PORTABLE STORAGE PLANT

James A. Page, Baton Rouge, La., assignor to Delta Tank Manufacturing Co., Inc., Baton Rouge, La., a corporation of Louisiana Application October 3, 1956, Serial No. 613,646

12 Claims. (Cl. 214—17)

This invention relates to a portable storage plant for bulk material.

In oil field and construction operations it is frequently desirable to set up rather substantial storage plants for storing cement, drilling mud or similar bulk materials, with facilities for unloading the material from the storage unit into trucks or other conveyances. In such operations the need for the storage plant in a particular location is relatively short lived and consequently after a period of time it is necessary to at least partially dismantle the unit and move it to another location. Installation of a conventional bulk storage plant ordinarily requires the service of a crew of skilled mechanics and usually takes approximately two weeks of time for setting up. Considerable auxiliary equipment is normally utilized so that the problem of moving the unit is often quite troublesome.

According to the present invention there is provided a completely portable unloading and storage plant for bulk pulverized material which is completely self contained and which may be set up in a period of approximately one day. The facilities for loading the storage plant with bulk material and for unloading such bulk material are integral with the unit so that no auxiliary equipment is needed.

Generally speaking the storage plant consists of a main unit which contains the loading and unloading equipment and one or more auxiliary units which increase the capacity of the plant. The main unit contains two superposed bins of which the upper bin is the live storage bin and the lower bin is the dead storage bin. The unit is unloaded by a discharge means on the live storage bin and when this bin is empty, material is transferred from the dead storage bin by means of transfer equipment integral with the unit. When both the live storage bin and the dead storage bin are emptied, material can be transferred from auxiliary units thereby greatly increasing the capacity of the plant. Material transfer within the main unit is effected by a vertical elevator passing through the live and dead storage bins and having a material receiving boot at the bottom thereof. In initially filling the storage plant, material is delivered to the boot and from there is transferred by the elevator into the upper storage bin. After the upper storage bin is completely filled overflow means transfers any excess to the lower or dead storage bin. After the capacity of this bin has been reached, overflowing material from the upper or live storage bin is fed into auxiliary bins in auxiliary units. When the live storage bin is empty or almost empty, material may be transferred from the dead storage bin into the boot and from there into the live storage bin by means of the elevator. Provision is made for delivering material from the auxiliary units into the boot from which it is also transferred into the live storage bin.

The main and auxiliary units are each provided with unique combinations of aeration pads which facilitate handling of the equipment and which prevent damage to the transfer equipment through packing or consolidation of the bulk material. A trailer wheel attachment and a kingpin bracket is provided for each unit so that each unit may be readily transported by means of a suitable towing device such as a tractor or truck.

It is accordingly a primary object of the present invention to provide an improved portable unloading and storage plant for bulk materials.

It is another object of the invention to provide a novel portable unloading and storage plant for bulk pulverized material which is completely integral and self-contained and which is suited to quick preparation for transportation and which may be set up in a short period of time.

It is another object of the invention to provide an unloading and storage plant of the foregoing type which has a high capacity for storing material and which has a capacity for rapid unloading without the necessity of shutting down to reload.

It is another object of the invention to provide an unloading and storage plant of the foregoing type which is constructed in such a manner as to virtually eliminate the difficulty and damage caused by packing and consolidation of the material contained therein.

It is another object of the invention to provide an unloading and storage unit of the foregoing type which is simple in operation, rugged in construction and highly reliable.

It is another object of the invention to provide an unloading and storage unit of the foregoing type which is rugged and not susceptible to jamming of moving parts.

These and further advantages of the invention will become apparent upon reference to the following specification and claims and appended drawings wherein:

Figure 1:
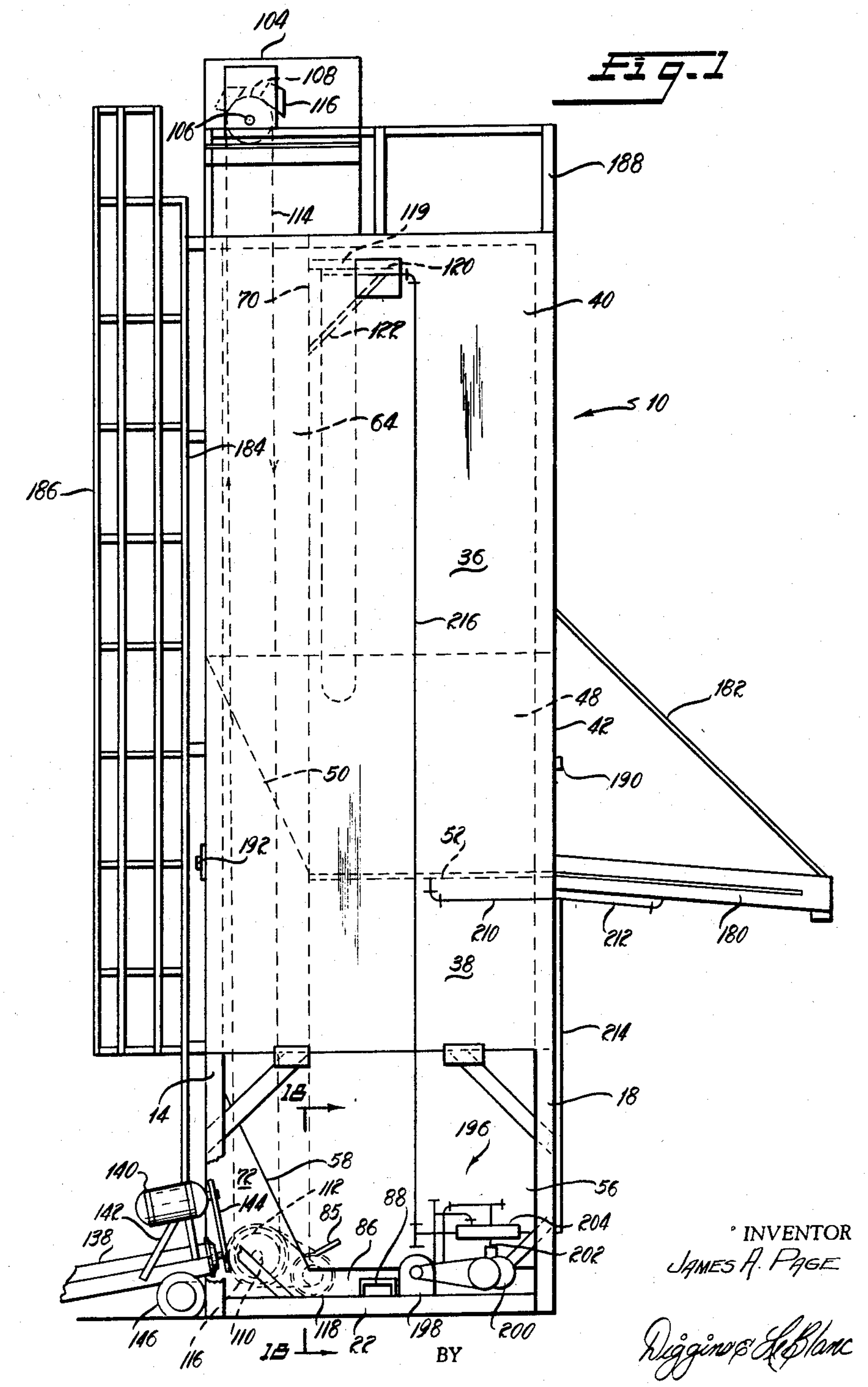
Figure 1 is a right side elevation of the main unit of the portable storage plant of the invention.
Figures 2, 19:
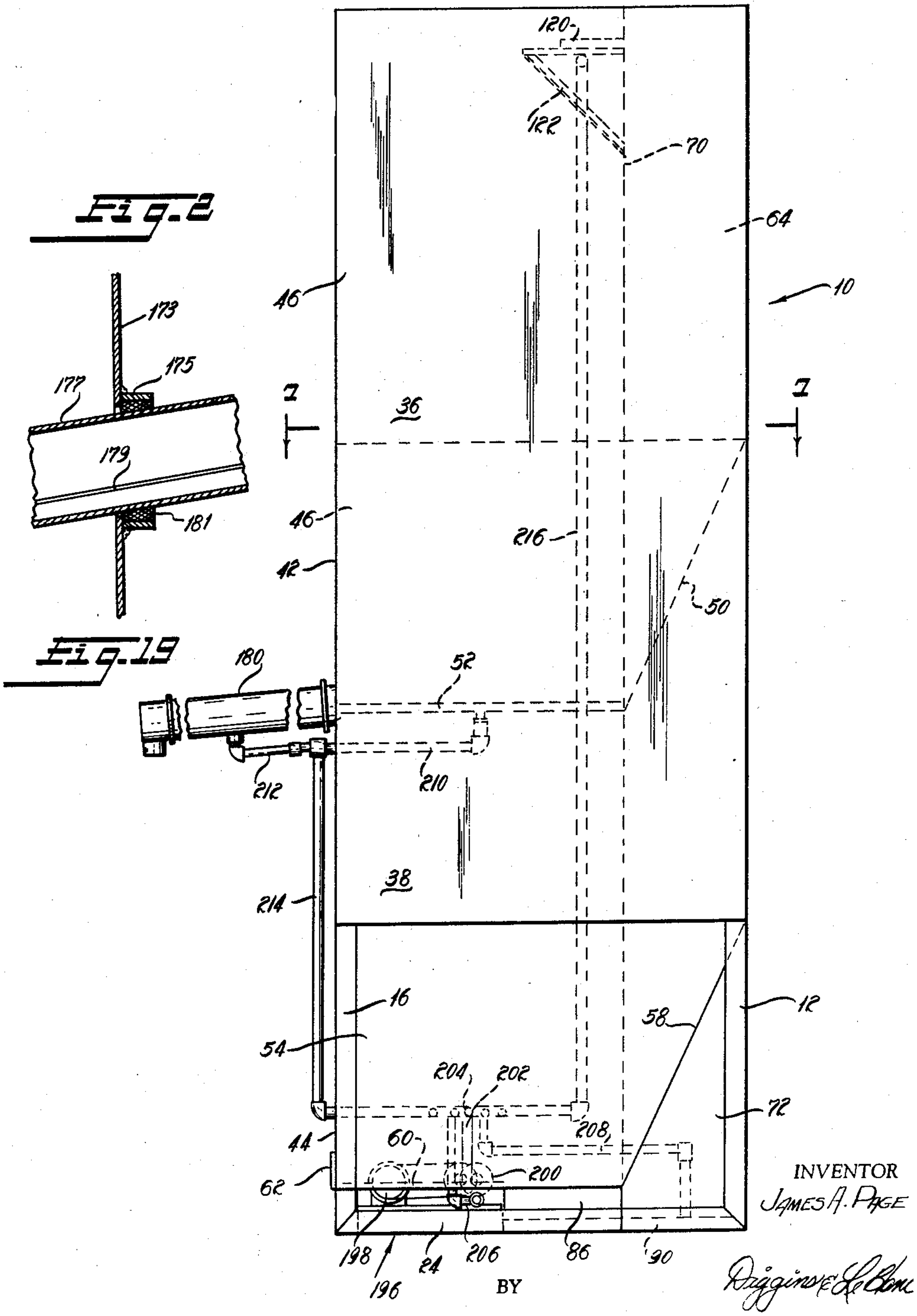
Figure 2 is a left side elevation of the main unit of the portable storage plant.
Figure 19 is a vertical section showing details of the connection of the transfer conduit to the bin.
Figure 3:
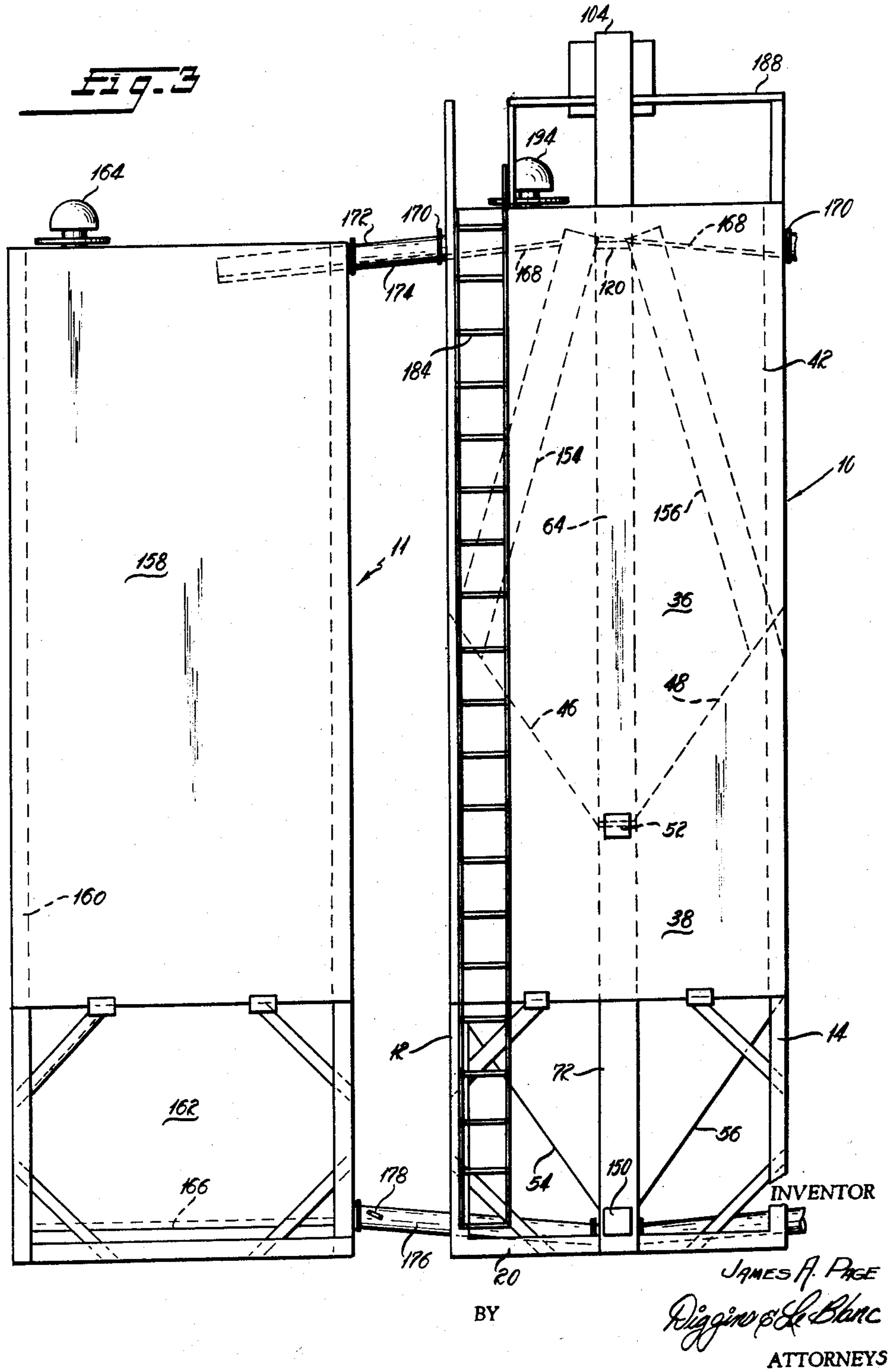
Figure 3 is a front elevation of the portable storage plant of the invention showing an auxiliary storage bin.
Figure 4:
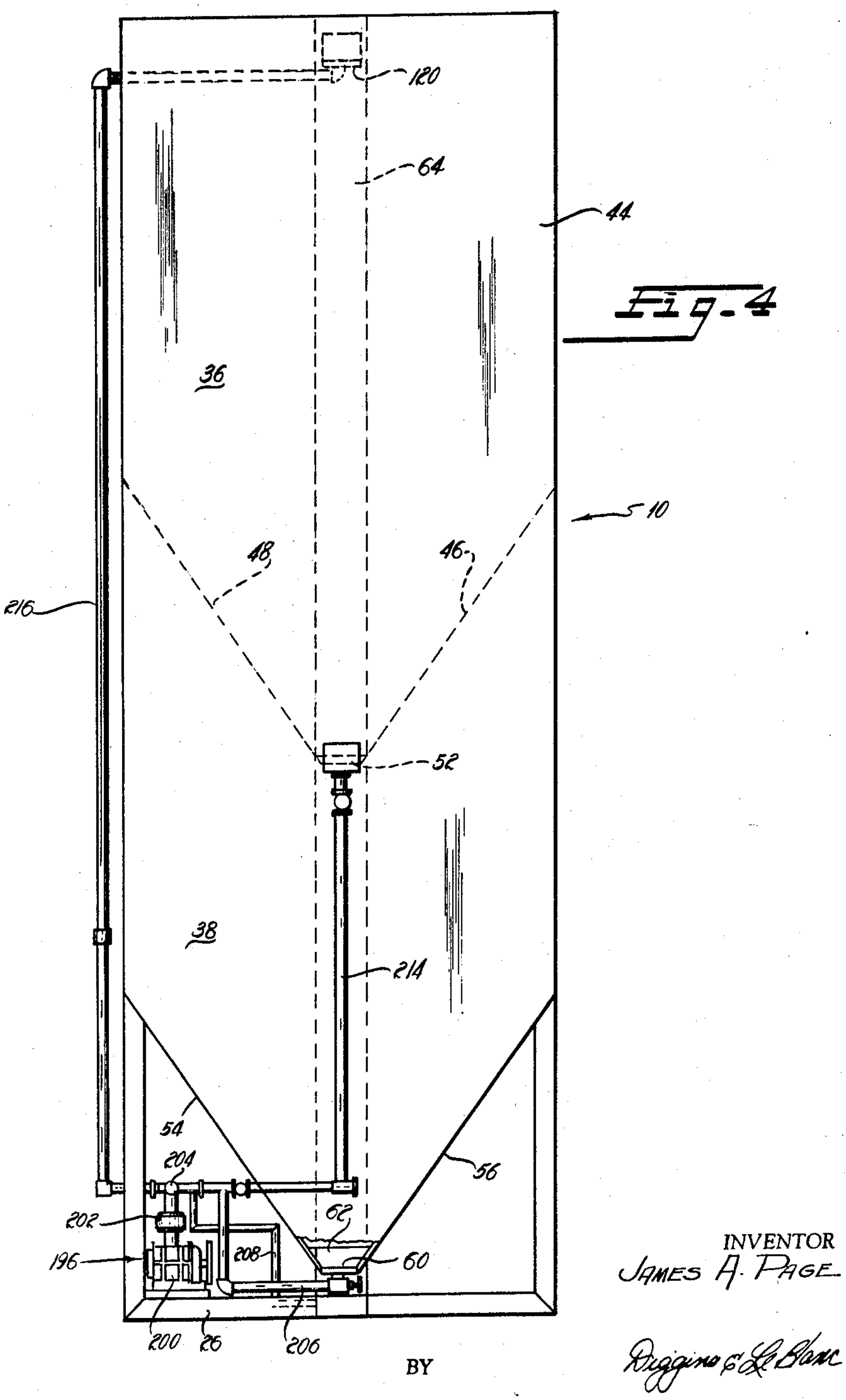
Figure 4 is a back elevation of the main unit of the portable storage plant of the invention.
Figure 7:
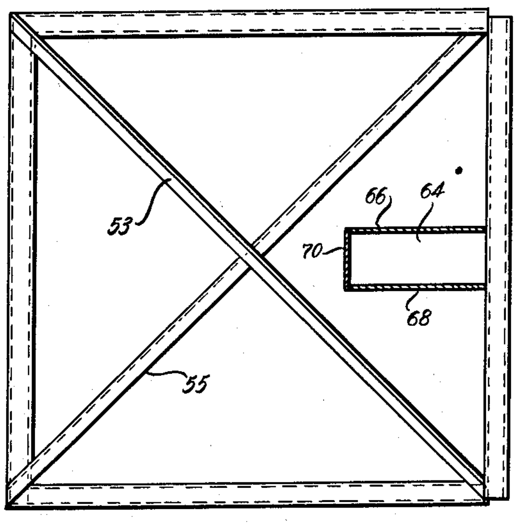
Figure 7 is a horizontal section of the main unit taken along the line 7—7 of Figure 2.
Figure 5:
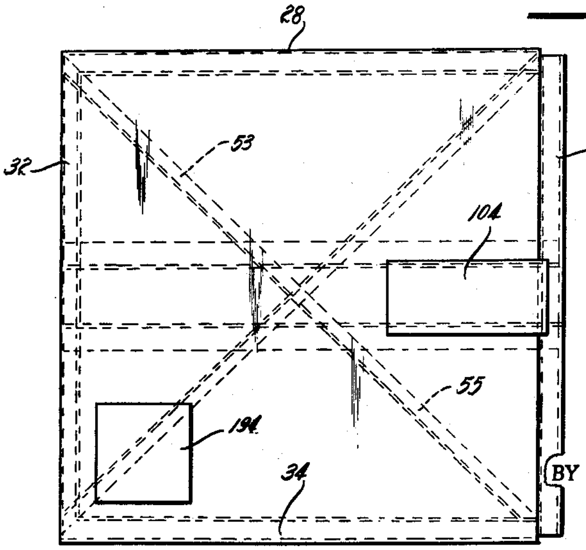
Figure 5 is a top view of the main unit of the portable storage plant.

Referring to Figures 1–4 of the drawings, the portable storage plant of this invention consists of a main unit indicated generally at 10 and may include auxiliary units, such as the unit shown generally at 11 in Figure 3. The main unit 10 comprises vertical angle support members 12, 14, 16 and 18 which are secured at their lower ends to horizontal angle support members 20, 22, 24 and 26, and at their upper ends to similar members 28, 30, 32 and 34. These support members form a rectangular frame for an upper or live storage bin 36 and a lower or dead storage bin 38. The outer vertical sides of the bins are formed by panels of sheet metal 40, 42, 44 and 46 which are welded or otherwise suitably secured to the vertical and horizontal support members of the frame. Referring to Figures 3 and 4, the upper bin 36 has a pair of inclined bottom side walls 46 and 48 which have their front edges welded to vertical wall 42. The back edges of the inclined side walls 46 and 48 are cut at an angle and welded or otherwise secured to an inclined front wall 50. The inclined walls 46, 48 and 50 of the upper bin are joined at their lower edges to an aeration pad 52 which forms the bottom of the upper or live bin. Both bins may be provided with internal cross braces such as braces 53 and 55 in Figure 7.

Figure 18:
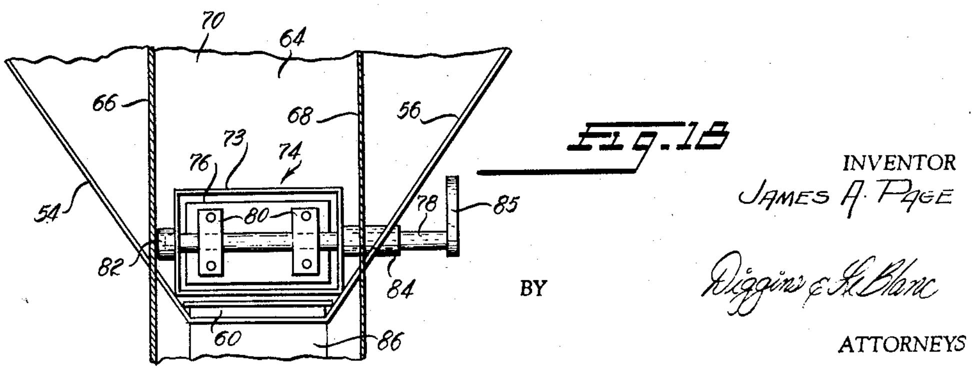
Figure 18 is a partial vertical section taken along the line 18—18 in Figure 1, showing the flow gate in the lower bin.

The lower bin 38 is also provided with inclined side walls 54 and 56 and a front inclined wall 58. The lower edges of inclined walls 54, 56 and 58 are joined to an aeration pad 60 which forms the bottom of lower bin 38 as is shown in Figures 2, 4 and 18. An access opening 62 is provided in the rear vertical wall 44 immediately adjacent to aeration pad 60 as is also seen in Figures 2 and 4. Extending upwardly through the inclined front walls 50 and 58 of both bins 36 and 38 is an elevator shaft 64 which consists of vertical side walls 66 and 68 and a vertical rear wall 70, best seen in Figure 7. The elevator shaft extends throughout the bins 36 and 38 and terminates at the very bottom of the unit in a portion 72 called the elevator boot. The side walls are secured to the inside of vertical wall 42 in any suitable manner, such as by welding. See Figures 1, 2 and 3. The boot extends down below inclined wall 58 in lower bin 38.

Referring to Figure 18, which is a vertical section taken along the line 18—18 in Figure 1, the rear wall 70 of the elevator shaft 64 is provided with an aperture 73 which opens from the lower bin 38 into the boot portion of the elevator shaft 64. This aperture is closed by means of a flow regulating valve 74 which comprises a door 76 mounted upon a shaft 78 by means of straps 80. The shaft 78 is carried for rotation in bearings 82 and 84 and is provided with an actuating handle 85. When the shaft 78 is rotated, the door 76 permits material to flow from the lower portion of the lower bin 38 into the boot 72 for a purpose presently to become apparent.

Figure 14:
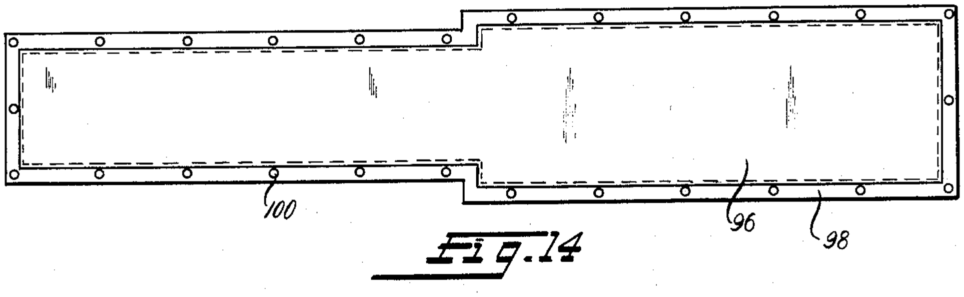
Figure 14 is a plan view of the boot air pad.
Figure 15:
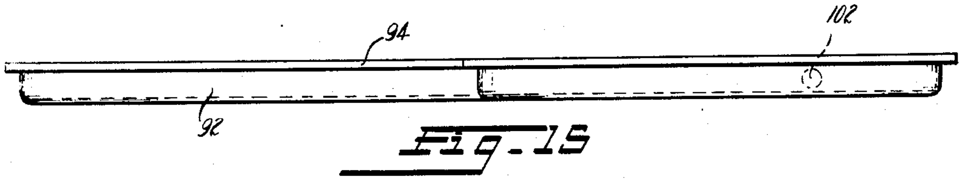
Figure 15 is a side elevation of the boot air pad.

Immediately to the rear of boot 72 and beneath the forward end of aeration pad 60 there is provided a shoe 86 having free access to the interior of the boot 72. Access openings 88 are provided in each side of the shoe 86 and the shoe terminates in a rear wall immediately to the rear of these openings. The bottom of the shoe 86 and boot 72 is formed by a boot aeration pad 90, as shown in Figure 2. This aeration pad is shown in detail in Figures 14 and 15 and consists of a shallow tray 92 having a flange 94 at the upper edge thereof. This tray is covered by one or more sheets of porous material 96, such as canvas or the like, and the canvas is stretched and held in position by means of a clamping member 98 which is secured to the flange 94 by bolts 100. A suitable connection for supplying air to the aeration pad is provided at 102. According to an important feature of the invention the aeration pad 90 covers substantially the entire floor of the boot.

Figure 16:
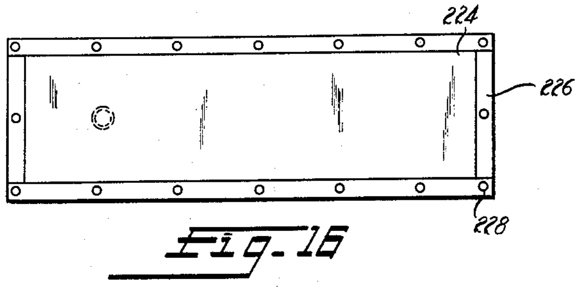
Figure 16 is a plan view of the top filler air pad.
Figure 17:
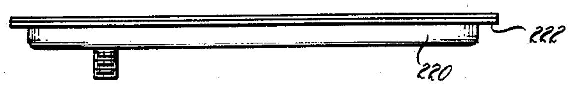
Figure 17 is a side elevation of the top filler air pad.

Referring to Figures 1 and 3, the elevator shaft 64 extends up above the top of the main unit to form an external housing 104. A shaft 106 is mounted in suitable bearings in the housing 104 and carries the elevator wheel 108. Mounted in the bottom of elevator shaft 64, in the boot portion thereof, is a second shaft 110 which carries a lower elevator wheel 112. Mounted over elevator wheels 108 and 112 is a chain hoist 114 carrying suitable buckets 116, only some of which are shown in Figure 1. The lower elevator wheel 112 is driven by a pulley 116 and motor 118 mounted at the base of the main unit at the left side thereof. When the motor 118 drives the elevator any material in the boot 72 is carried to the top of the elevator shaft into housing 104 and is there dumped onto a filler aeration pad 119 which is fastened to a shelf 120 attached to the wall 70 of the elevator shaft. The shelf 120 may be supported by suitable brackets 122. Details of the top filler aeration pad are shown in Figures 16 and 17. Thus this pad consists of a flat pan 220 having a flange 222 around the upper edge thereof. A layer of pervious material 224, such as canvas or similar material is spread across the top of the pan and is secured thereon by means of binding strips 226 secured to flange 222 by bolts 228.

Figure 12:
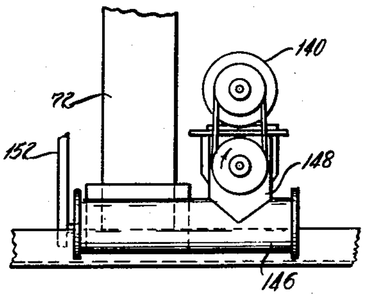
Figure 12 is a vertical elevation of the cross feed assemblage.
Figure 13:
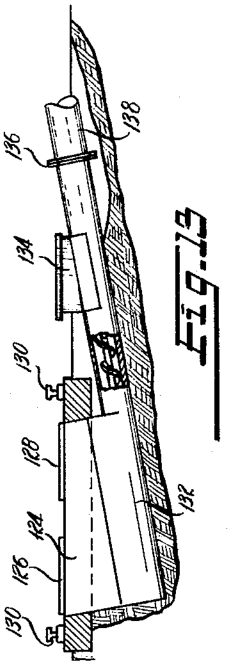
Figure 13 is a vertical section showing the car and truck unloader.

Material is originally introduced into the main unit from railroad cars or trucks by means of a car and truck unloader shown in detail in Figure 13. This unloader consists of a car hopper 124 having a pair of mouths 126 and 128 disposed between the rails 130 of a railroad track. The hopper 124 is mounted atop a pipe 132 buried beneath the rails 130 and a truck hopper 134 is also connected to pipe 132 for receiving the contents of a truck. Pipe 132 is connected by means of flange 136 to a feeder conduit 138 which extends above the ground and terminates proximate the front of the storage unit as shown in Figure 1. A helical screw, not shown, extends through conduit 138 and pipe 132 and is driven by means of a motor 140 mounted atop conduit 138 by brackets 142. The motor 140 drives the helical screw through the belt or chain 144. Beneath conduit 138 at the motor end thereof is a cross-feed conduit 146 which communicates with conduit 138 through a short vertical conduit 148. See Figure 12. The other end of the cross feed conduit communicates with an opening 150 in boot 72 (see Figure 3). A helical screw is provided in cross feed conduit 146 and this is driven by a belt 152, which is in turn driven by a pulley on shaft 110 at the bottom of the elevator. While the helical screw in the feed conduit 138 could be driven from the same source of power as the cross screw in the cross feed conduit 146, it has been found that this leads to alignment difficulties and that a separate drive for the screw in conduit 138 is desirable.

Material which is deposited by the elevator buckets 116 on filler aeration pad 119 fills up the upper or live storage bin 36. Referring to Figure 3, a pair of overflow pipes 154 and 156 are provided in the upper bin to conduct overflow material from that bin into the lower bin 38. These overflow pipes 154 and 156 are attached at their upper ends to shelf 120 and communicate with the lower bin through inclined side walls 46 and 48. Material may be transferred from the lower or dead storage bin to the upper or live storage bin by opening flow valve 74 in the lower bin to permit material to enter the boot. Once the material is in the boot the elevator may be operated to deposit the material in the upper bin.

When both the upper and the lower bins are full provision is made for storing material in auxiliary bins which may be mounted on either side of the main storage unit. Thus referring to Figure 3 there is shown an auxiliary bin 11 which is generally similar to the main bin in that it is comprised of an angle frame 160, vertical side walls 158, and inclined bottom walls 162. A vent 164 is provided at the top of the auxiliary bin and an aeration pad 166 is provided at its bottom. Overflow material from the upper bin 36 in the main storage unit is conveyed to the auxiliary bin on aeration pads 168 in the main unit. Aeration pads 168 are connected to the filler aeration pad 119 on shelf 120 and terminate at discharge ports 170. A discharge conduit 172 having a self contained aeration pad 174 feeds the material into auxiliary bin 11. Material is removed from auxiliary bin 11 by means of a discharge conduit 176 having a flow valve 178 and an internal aeration pad, not shown.

The discharge conduit 176 at the bottom of the auxiliary bin is connected to one of the apertures 88 in the shoe 86 at the bottom of the lower bin 38 in the main unit. The material flows from conduit 176 onto aeration pad 90 in the shoe and from here into the boot 72. From here the material may be picked up by the elevator buckets 116 and deposited in the upper bin 36 for ultimate discharge. Since, as a practical matter, it is virtually impossible to manufacture and erect bins of this size to exact dimensions, I have found it desirable to allow for any misalignment that might occur. Specifically I have found it desirable to make provision for both angular and spacing misalignments between the main and auxiliary units. Referring to Figure 19 there is shown a detail of the preferred manner of connecting the transfer conduits 172 and 176 to the two units. The wall 173 is provided with an inwardly extending flange 175 and the transfer conduit 177 passes therethrough. The diameter of transfer conduit 177 is less than that of the flanged opening and the annular space therebetween is packed with alternate layers of oakum and asbestos cement. This connection allows the conduit 177 both pivotal and sliding freedom with respect to wall 173 while maintaining a tight seal. The conduit is provided with a suitable aeration pad 179.

The storage unit is unloaded from the upper or live storage bin 36 through a discharge conduit 180 which is provided with its own internal aeration pad. The discharge conduit 180 receives material from aeration pad 52 at the bottom of live storage bin 36. The discharge conduit 180 is supported by a chain or bracket 182 and is at a height to permit discharge into a truck. A ladder 184 and guard rail 186 are provided at the front of the main storage unit and a hand rail 188 is provided at the top thereof. Lights 190 and 192 may also be provided for operation after darkness. A vent 194 is provided at the top of the main unit.

The main storage unit is provided with its own self contained air blower system for supplying air to the various airslides. Thus, referring to Figures 1, 2 and 4, the blower unit is shown at 196 and consists of a suitable motor 198 and blower 200. The blower 200 is connected through pipe 202 to a manifold 204. Again referring to Figures 1, 2 and 4, the lower aeration pad 60 is supplied with air through a pipe 206, while the boot aeration pad 90 is supplied with air through pipe 208. The aeration pad 52 in upper bin 36 and the aeration pad in the discharge conduit 180 are supplied with air through pipes 210, 212 and 214 respectively. The filler aeration pad 119, the discharge aeration pads 168, and the aeration pads in discharge conduits 172 are supplied with air through pipe 216.

Figure 8:
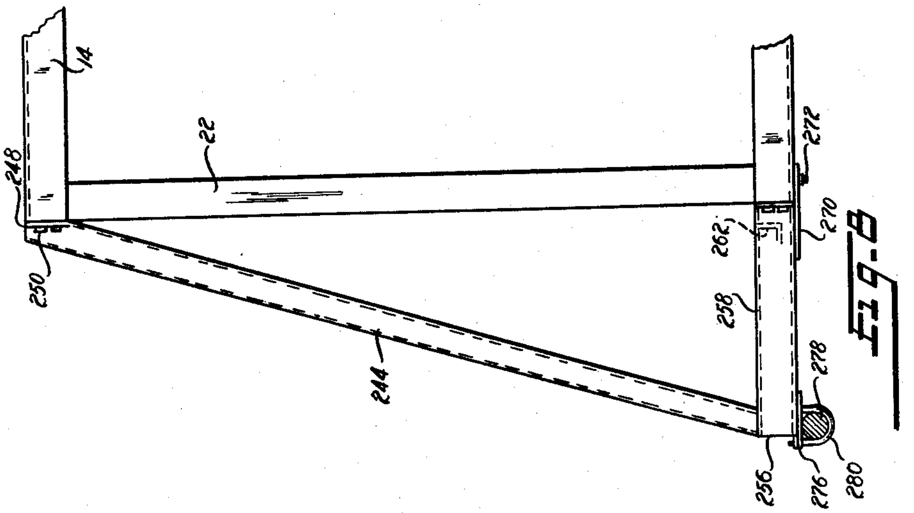
Figure 8 is a side view of the trailer wheel attachment.
Figure 6:
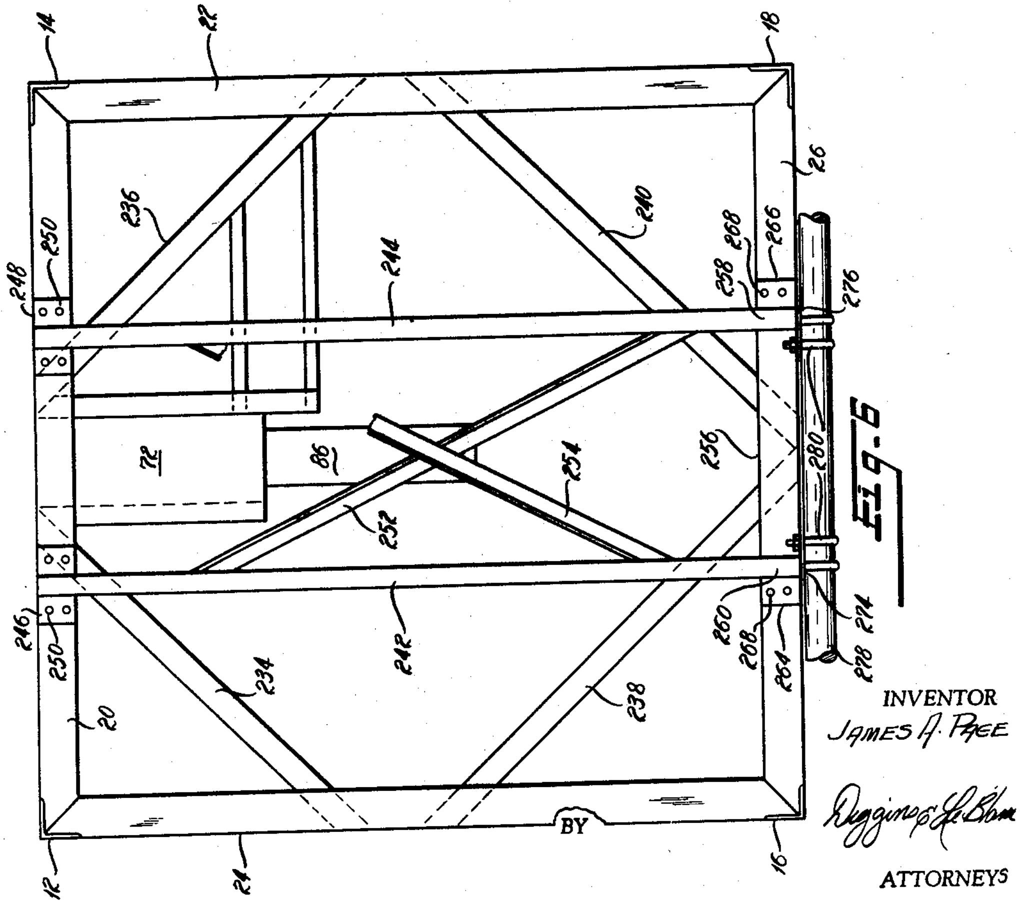
Figure 6 is a bottom view of the main unit of the portable storage plant showing the trailer wheel attachment.
Figure 11:
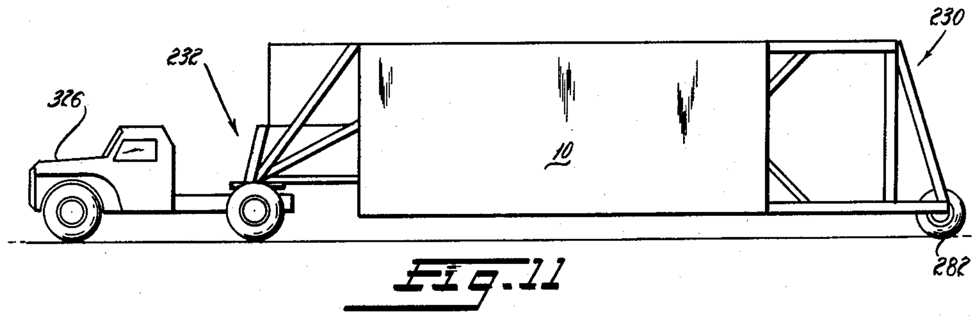
Figure 11 is a perspective view showing the main unit of the portable storage plant with the kingpin bracket assembly and trailer wheel attachment being towed by a tractor.

In order to make the storage unit portable it is provided with a detachable trailer wheel attachment, shown generally at 230 in Figure 11, and with a detachable kingpin bracket, shown generally at 232 in Figure 11. Referring to Figures 6 and 8, which show bottom and side views of the lower end of the main storage bin, it will be seen that the frame consisting of support members 20, 22, 24 and 26 is cross braced by members 234, 236, 238 and 240. The trailer wheel attachment consists of a pair of parallel channel members 242 and 244 attached at their upper ends to support member 20. The connection between channel members 242 and 244 and support member 20 may be made in any detachable manner, as by means of brackets 246 and 248 which may be welded to the channel members 242 and 244 and secured to support member 20 by means of bolts 250. Cross bracing angles 252 and 254 are provided between parallel channel members 242 and 244 and the lower ends of these channel members are connected to a cross channel 256. Side members 258 and 260 extend forwardly from cross channel 256 and are secured together at their forward ends by means of an angle 262, see Figure 8. The forward ends of members 258 and 260 are also connected to support member 26 by means of brackets 264 and 266 and bolts 268. Additional securement is provided by brackets 270 welded to the underside of members 258 and 260 and bolts 272 which engage the frame of the storage unit. A pair of plates 274 and 276 are welded to the underside of members 256, 258 and 260 and an axle 278 is secured to these plates by means of U-bolts 280. Suitable wheels 282 are provided on the axle as shown in Figure 11.

Figure 10:
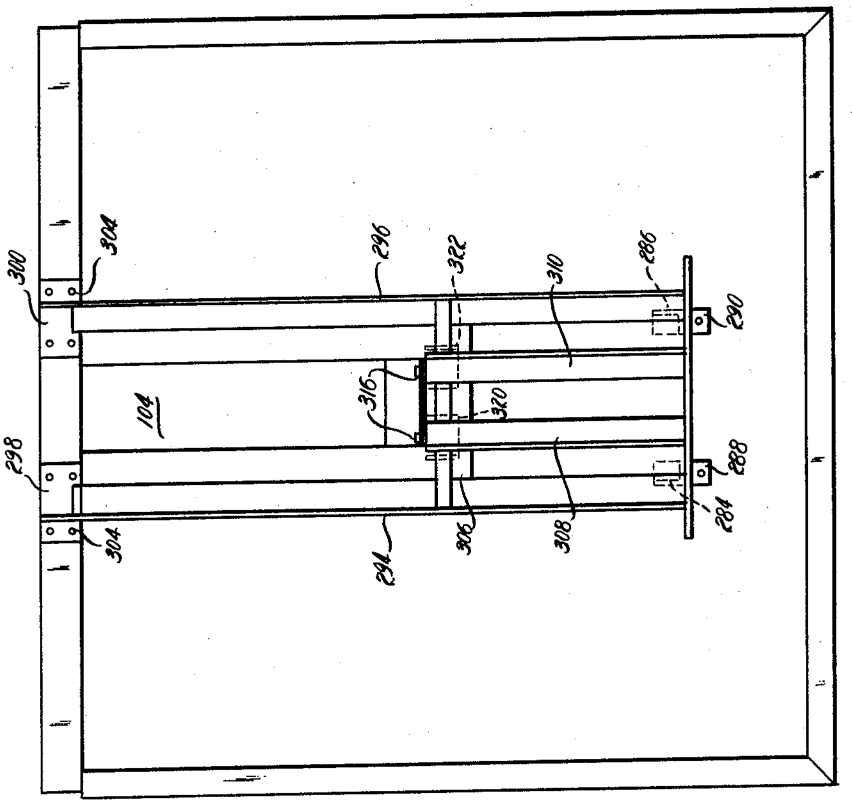
Figure 10 is an end view of the kingpin bracket assembly attached to the top of the main unit.
Figure 9:
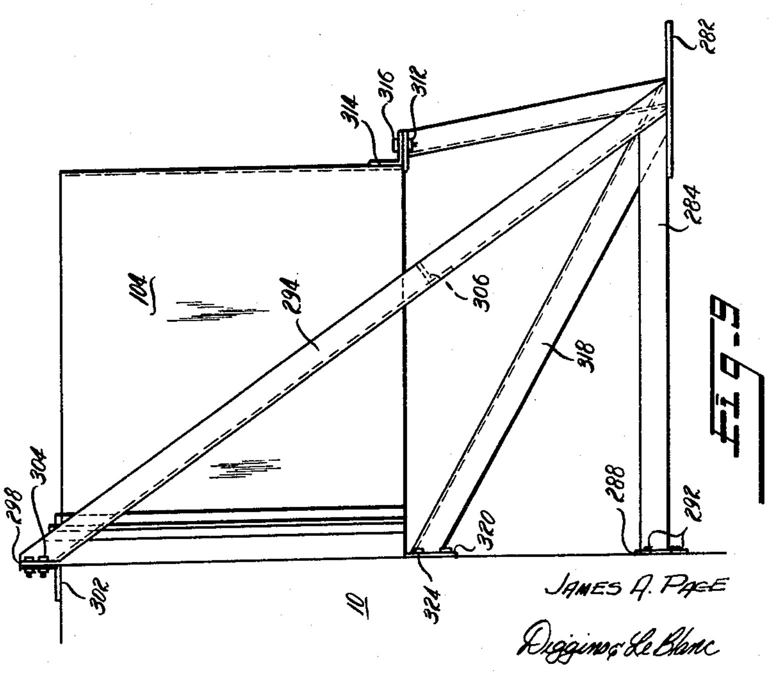
Figure 9 is a side view of the kingpin bracket assembly.

The top of the storage unit is provided with a kingpin bracket as shown in detail in Figures 9 and 10. This bracket consists of a kingpin plate 282 having a pair of parallel horizontal angle members 284 and 286 welded thereto. The members 284 and 286 are provided with brackets 288 and 290 which permit fastening the members 284 and 286 to the top of the storage unit 10 by bolts 292. Also attached to kingpin plate 282 on the outside of members 284 and 286 are a second pair of parallel angle members 294 and 296 which extend upwardly from the plates and terminate in attaching plates 298 and 300 which are bolted to an angle member 302 by means of bolts 304. The angle member 302 is secured to the top of the storage unit 10 as by welding. A cross angle member 306 is provided between upwardly extending angle members 294 and 296 beneath the housing 104. A third pair of parallel angle members 308 and 310 are attached to the kingpin plate 282 between members 284 and 286 and extend upwardly to terminate in an attachment plate 312 which may be bolted to a mounting bracket 314 by bolts 316. Mounting bracket 314 is secured to the top of housing 104 in any suitable means, such as by welding. Still a fourth pair of parallel angle members 318 (see Figure 9) is attached to the kingpin plate 282 immediately behind members 308 and 310 and these members 318 extend upwardly to terminate in mounting plates 320 and 322 which are secured to the top of the storage unit 10 by bolts 324. A kingpin 283 is welded to kingpin plate 282 and engages a locking aperture in the fifth wheel of the truck in the conventional manner.

The operation of this unit is as follows. When it is desired to ship the unit from the factory to a point of use or from one point of use to another point of use the main unit 10 is tipped over on its side and the kingpin bracket 232 and trailer wheel attachment 230 attached thereto. The kingpin plate is then attached to a kingpin on a tractor or truck 326, as shown in Figure 11, and the unit may be towed to the desired location. This same procedure may also be used with the auxiliary storage bins. After the units have arrived at the desired location, the kingpin bracket and trailer wheel attachment are removed and the units are again stood upright. The car and truck unloader shown in Figures 1 and 13 are then properly placed in position and the cross feed conduit 146 connected to the boot 72. If auxiliary tanks are to be utilized they are also set in an upright condition and feed conduits 172 and 176 in Figure 3 are attached. It will be obvious from Figure 3 that a similar auxiliary bin could be set up on the right side of the main bin there shown.

In order to load the main storage bin the motor 198 is started to cause operation of the air blower 200 to provide an air supply to the various aeration pads. Motor 140 on the car and truck unloader conduit 138 is then started and material is dumped into either the car or truck unloader hoppers 124 or 134 as the case may be. Material dumped into either one or both of these hoppers is conveyed by the screw in conduits 132 and 138 into the cross feed conduit 146 and is fed from there into the boot 72. The elevator is started and picks up material from the boot and delivers it to the upper or live storage bin 36. After this storage bin is completely filled material overflows into tubes 154 and 156 into the lower or dead storage bin 38. After the dead storage bin 38 is completely filled, air is supplied to aeration pads 168 in the upper storage bin and to aeration pads 174 in discharge conduits 172 to deliver material to the auxiliary bins 11. Once these bins are filled the entire device is filled to capacity and loading is completed.

Unloading occurs only from the live storage or upper bin 36 through discharge conduit 180. In order to effect this unloading air is supplied to the aeration pad 52 at the bottom of the live storage bin and to the aeration pad, not shown, in the discharge conduit 180. After the upper or live storage bin is emptied or while it is being emptied material can be transferred from the lower or dead storage bin 38 by opening flow control valve 74 and operating the elevator to remove material from the boot into the upper or live storage bin. Material can also be drawn from the auxiliary storage bin 158 by supplying air to the aeration pad 166 in the storage bins 11 and also supplying air to the aeration pads in the conduits 176. By opening the flow gate 178 in these conduits material is fed into the shoe 86 beneath the lower or dead storage bin 38. From here the material flows across aeration pad 90 into the boot from which it is removed by the elevator and deposited in the live storage bin.

The live storage bin may hold about five truck loads of material which is available for use with only the blower operating. This material discharges very rapidly so that it is unnecessary to operate the elevator to fill this number of trucks. Even during periods when trucks are arriving periodically it is unnecessary to operate the elevator in order to fill individual trucks since the operator may refill the live storage bin during periods when no trucks are being loaded. The entire unit is self contained and utilizes rugged equipment which is not subject to frequent breakdowns or jamming. The entire unit including auxiliary tanks may be set up in approximately one day and may be made ready for moving in a matter of hours.

The motors for the elevator and feed screws and the motor for the air blower may be electric where electricity is available, or may be internal combustion engines where electric power is not available. The entire unit, including the elevator, is self contained and is capable of operation by unskilled labor. The elevator operating switch may be suitably interlocked with the air supply to the boot aeration pad to prevent damage to the elevator. As long as the elevator is operating the movement of the buckets keeps the material aerated and moving freely. If the elevator is stopped while there is still a substantial amount of material in the boot this material settles, tends to solidify or pack, and without additional aeration would severely damage the elevator if it were to be started up. In the unit described herein an aeration pad is provided across the entire elevator floor so that starting this aeration pad prior to starting the elevator completely aerates material in the boot and elevator shaft and permits free movement of the elevator. While material packing presented a very considerable problem in prior storage plants for bulk materials, the arrangement of the instant unit, particularly the arrangement of feeds and aeration pads, has substantially eliminated this problem.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A storage apparatus for bulk material comprising in combination, upper and lower storage bins in superposed relation, said upper bin having a volumetric capacity substantially as great as that of said lower bin, an elevator shaft extending upwardly by said bins, the lower end of said elevator shaft terminating in a boot external of said lower bin, a flow regulating valve between said lower bin and said boot to permit material to flow from said lower bin into said boot, an elevator mounted in said shaft for conveying material from said boot to said upper bin, overflow conduit means communicating with the upper portions of the lower bin and the upper portion of the upper bin to transfer overflow of material from said upper to said lower bin, aeration pad means covering substantially the entire floor of said boot beneath said elevator, means for supplying air to said aeration pad means, discharge means in the lower portion of said upper bin for unloading material therefrom, an auxiliary bin on the side of said superposed bins, and means for conveying overflow from said upper bin to said auxiliary bin and means for conveying material from said auxiliary bin into said boot.

2. A storage apparatus for bulk material comprising in combination, a unitary container having substantially parallel vertical walls, a first pair of floor plates attached to opposite parallel walls substantially intermediate their vertical height and converging downwardly to a first narrow substantially horizontal aeration pad, a third floor plate attached to one of said vertical walls substantially intermediate its vertical height and extending downwardly away from said wall to said aeration pad, a second pair of floor plates attached to said opposite parallel walls substantially at the bottom thereof and converging downwardly to a second aeration pad which extends from one of said vertical walls towards the center of said container, a fourth floor plate attached to said same vertical wall as said third floor plate and extending substantially parallel to said third floor plate, the edge of said second aeration pad and the lower edges of said second pair of floor plates and said fourth floor plate joining a shoe below said floor plates, an elevator shaft extending upward through said third and fourth floor plates and having a boot at the bottom thereof communicating with said shoe, a vertically disposed elevator in said shaft, conduit means extending through said first pair of floor plates to the top of said container, and discharge means passing through one of the walls of said container substantially at the lower edges of said first pair of floor plates.

3. A storage apparatus as set out in claim 2 including a flow regulating valve in said fourth wall to provide commuication therethrough to said boot.

4. A storage apparatus as set out in claim 2 including a third aeration pad attached to the top of said elevator shaft and extending away therefrom toward the center of said container.

5. A storage apparatus for bulk material comprising in combination, upper and lower storage bins in superposed relation, said upper bin having a tapered lower end and vertical walls extending therefrom, an elevator shaft extending upward through said bin, the lower end of said elevator shaft terminating in a boot external of said lower bin, a flow regulating valve between said lower bin and said boot to permit material to flow from said lower bin into said boot, an elevator mounted in said shaft for conveying material from said boot to said upper bin, overflow conduit means communicating with the upper portion of the upper bin and the upper portion of the lower bin to transfer overflow of material from said upper to said lower bin, discharge means in the lower portion of said upper bin for unloading material from said upper bin, said upper and lower bins and said elevator comprising an integral portable unit including means for operating said elevator, said elevator extending above the top of said upper bin, said means for operating said elevator being positioned below said lower bin, each of said bins having oppositely disposed inwardly inclined walls joined by a third inwardly inclined wall, said elevator shaft extending through said third wall, aeration pads at the bottom of the inclined walls of said upper and lower bins, another aeration pad at the bottom of said boot beneath said elevator, means mounted below said lower bin for supplying air to said aeration pads, said apparatus including a frame portion below said lower bin, and said means for operating said elevator and said means for supplying air being mounted within said frame portion.

6. An apparatus as set out in claim 5 including a kingpin attachment detachably attached to the upper end of said upper bin, a housing covering the portion of said elevator extending above said upper bin, said kingpin attachment having portions thereof attached to said housing, and having a kingpin for attachment to a kingpin receptor on a towing device.

7. An apparatus as set out in claim 5 including a vehicle unloader conduit terminating adjacent said boot and communicating with said boot through a cross feed conduit.

8. An apparatus as set out in claim 7 wherein said vehicle unloader conduit contains a screw, a source of motive power mounted on said conduit for driving said screw, a screw in said cross feed conduit, and means connecting said screw in said cross feed conduit to said means for operating said elevator.

9. A storage apparatus for bulk material comprising in combination, upper and lower storage bins in superposed relations, an elevator shaft extending upwards through said bins, the lower end of said elevator shaft terminating in a boot external of said lower bin, a flow regulating valve between said lower bin and said boot to permit material to flow from said lower bin into said boot, an elevator mounted in said shaft for conveying material from said boot to said upper bin, overflow conduit means communicating with the uper portion of the upper bin and the upper portion of the lower bin to transfer overflow of material from said upper to said lower bin, first aeration pad means covering substantially the entire floor of said boot beneath said elevator, second aeration pad means mounted in the upper portion of said upper bin at a position where the material deposited by said elevator falls thereon, means for supplying air to said aeration pad means, and discharge means in the lower portion of said upper bin for unloading material therefrom.

10. An apparatus as set out in claim 9 including third and fourth aeration pad means at the bottom of each of said bins, and aeration pad means in said discharge means.

11. An apparatus as set out in claim 9 including aeration pad means extending from said second aeration pad means to openings in the upper portion of said upper bin to convey material thereout.

12. An apparatus as set out in claim 9 including third and fourth aeration pad means at the bottom of each of said bins, and fifth and sixth aeration pad means extending from said second aeration pad means to openings in the upper portion of said upper bin to convey material thereout.

References Cited in the file of this patent

UNITED STATES PATENTS

| | | |
|---|---|---|
| 2,048,877 | McCrery | July 28, 1936 |
| 2,347,437 | Saxe | Apr. 25, 1944 |
| 2,448,745 | Struckmann | Sept. 7, 1948 |
| 2,509,983 | Morrow | May 30, 1950 |
| 2,730,256 | Louden et al. | Jan. 10, 1956 |
| 2,739,804 | Funderburk | Mar. 27, 1956 |